US009253738B2

(12) United States Patent
Kim et al.

(10) Patent No.: US 9,253,738 B2
(45) Date of Patent: Feb. 2, 2016

(54) METHOD AND APPARATUS FOR RADIO LINK CONTROL IN CELLULAR RADIO COMMUNICATION SYSTEM SUPPORTING CARRIER AGGREGATION

(75) Inventors: Young Bum Kim, Seoul (KR); Joon Young Cho, Suwon-si (KR); Ju Ho Lee, Suwon-si (KR); Jin Kyu Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 13/147,283

(22) PCT Filed: Feb. 1, 2010

(86) PCT No.: PCT/KR2010/000585
§ 371 (c)(1),
(2), (4) Date: Aug. 19, 2011

(87) PCT Pub. No.: WO2010/087659
PCT Pub. Date: Aug. 5, 2010

(65) Prior Publication Data
US 2011/0292812 A1 Dec. 1, 2011

(30) Foreign Application Priority Data

Feb. 2, 2009 (KR) .................. 10-2009-0007880

(51) Int. Cl.
*H04W 52/34* (2009.01)
*H04L 5/00* (2006.01)
*H04L 27/26* (2006.01)
(Continued)

(52) U.S. Cl.
CPC ............ *H04W 52/34* (2013.01); *H04B 17/309* (2015.01); *H04L 5/006* (2013.01); *H04L 5/0044* (2013.01); *H04L 27/2675* (2013.01); *H04L 1/0026* (2013.01); *H04L 5/001* (2013.01); *H04W 24/10* (2013.01); *H04W 28/06* (2013.01)

(58) Field of Classification Search
None
See application file for complete search history.

(56) References Cited

U.S. PATENT DOCUMENTS 6,535,738 B1 3/2003 Bomar et al.
2006/0133404 A1 6/2006 Zuniga et al.
(Continued)

FOREIGN PATENT DOCUMENTS

CN 1842058 A 10/2006
CN 101022417 A 8/2007
(Continued)

OTHER PUBLICATIONS

Ericsson, Introduction of Dual-Cell HSDPA Operation on Adjacent Carriers, 3rd Generation Partnership Project (3GPP) TSG-RAN WG1 Meeting, Sep. 29-Oct. 3, 2008, R1-083974, Mobile Competence Centre, Sophia-Antipolis Cedex, France.
(Continued)

*Primary Examiner* — Diane Lo
(74) *Attorney, Agent, or Firm* — Jefferson IP Law, LLP

(57) ABSTRACT

The present invention relates to a method and apparatus for determining radio link failure between the UE and the eNB in a wireless communication system. Particularly, the present invention provides a method and apparatus for determining radio link failure efficiently in such a way that the UE measures the radio link quality of the anchor carrier, the radio link qualities of the aggregated carriers, and the radio link quality of neighbor cells in order, and determines whether the radio link quality fulfills a predetermined condition.

14 Claims, 6 Drawing Sheets

(51) Int. Cl.
*H04B 17/309* (2015.01)
*H04L 1/00* (2006.01)
*H04W 24/10* (2009.01)
*H04W 28/06* (2009.01)

(56) References Cited

U.S. PATENT DOCUMENTS

| | | | |
|---|---|---|---|
| 2006/0221933 A1 | 10/2006 | Bauer et al. | |
| 2006/0280142 A1* | 12/2006 | Damnjanovic et al. | 370/329 |
| 2009/0042572 A1* | 2/2009 | Craig et al. | 455/436 |
| 2010/0034092 A1* | 2/2010 | Krishnamurthy et al. | 370/241 |
| 2010/0222059 A1* | 9/2010 | Pani et al. | 455/436 |
| 2011/0076999 A1* | 3/2011 | Kazmi et al. | 455/423 |
| 2011/0080825 A1* | 4/2011 | Dimou et al. | 370/216 |

FOREIGN PATENT DOCUMENTS

| | | |
|---|---|---|
| CN | 101084683 A | 12/2007 |
| CN | 101277145 A | 10/2008 |
| EP | 1 179 961 A1 | 2/2002 |
| KR | 10-2002-0065824 A | 8/2002 |
| WO | 2006-052565 A2 | 5/2006 |

OTHER PUBLICATIONS

Huawei, Discussion on RLF in DC-HSDPA, 3rd Generation Partnership Project (3GPP) TSG-RAN WG2 #63, Aug. 18-22, 2008, R2-084402, Mobile Competence Centre, Sophia-Antipolis Cedex, France.

* cited by examiner

METHOD AND APPARATUS FOR RADIO LINK CONTROL IN CELLULAR RADIO COMMUNICATION SYSTEM SUPPORTING CARRIER AGGREGATION

BACKGROUND OF THE INVENTION

1. Field of the Invention

The present invention relates to a cellular radio communication system and, in particular, to a method and apparatus for controlling radio link based on whether radio link failure is detected.

2. Description of the Related Art

Recently, many researches are being conducted on the Orthogonal Frequency Division Multiple Access (OFDMA) and Single Carrier Frequency Division Multiple Access (SC-FDMA) as useful schemes for high speed data transmission over a radio channel. In such multiple access schemes, the user-specific data and/or control information are mapped to time-frequency resources without overlapped from each other, i.e. maintaining orthogonality, to identify the user-specific data and/or control information.

In a cellular communication system, one of the significant factors to provide high-speed wireless data service is bandwidth scalability for dynamic resource allocation. For example, Long Term Evolution (LTE) system can support the bandwidths of 20/15/10/5/3/1.4 MHz. The carriers can provide services with at least one of the bandwidths, and the user equipments can have different capabilities such that some supports only 1.4 MHz bandwidth and others up to 20 MHz bandwidth. The LTE-Advanced (LTE-A) system, aiming at achieving the requirements of the IMT-Advanced service, can provide broadband service by aggregating carries up to 100 MHz.

The LTE-A system needs the bandwidth wider than that of LTE system for high-speed data transmission. Simultaneously, the LTE-A system needs to be backward compatible with the LTE system such that the LTE UEs can access the services of the LTE-Advanced system. For this purpose, the entire system bandwidth of the LTE-A system is divided into sub-bands or component carriers that have a bandwidth supporting transmission or reception of the LTE UE and can be aggregated for supporting the high speed data transmission of the LTE-A system in the transmission/reception process of the legacy LTE system per component carrier.

Meanwhile, if the radio rank quality between a transmitter and a receiver is degraded below a predetermined level, it is difficult to expect the normal data communication. Accordingly, the UE or the eNB monitors the radio rank quality to determine the Radio Link Failure (hereinafter, referred to as RLF) and performs the operation corresponding to the RLF. A description is made of a procedure for a UE to determine whether RLF occurs in the legacy system not supporting carrier aggregation with reference to FIG. 1.

The UE connects to an eNB to transmit and receive data (108), recognizes, if the radio link quality with the base station degrades continuously for a predetermined observation period, the problem of the radio link (110), and determines, if the radio link quality does not recovered for a predetermined time T1 (112), occurrence of RLF (104). If the RLF is detected, the UE attempts to connect to a cell having the best radio link quality among the neighbor cells for a predetermined time duration T2 (114) to continue, if the attempt is successful, data transmission/reception and end, if the attempt fails, end all the transmission/reception operations and transition to idle mode (116).

The procedure related to the RLF is defined for the conventional system without consideration of carrier aggregation and thus there is a need to define a procedure for controlling the radio link depending on whether RLF occurs or not in the wireless communication system supporting carrier aggregation.

SUMMARY OF THE INVENTION

Problem to be Solved

In order to solve the above problems, the present invention provides a method and apparatus for controlling radio links by determining whether the radio link failure occurs in the wireless communication implementing wide bandwidth by aggregating carriers.

Means for Solving the Problem

In order to achieve the above objective, a radio link control method of a terminal for a cellular radio communication system supporting carrier aggregation according to the present invention includes measuring radio link qualities of more than one component carrier, determining whether at least one radio link quality is equal to or greater than a threshold value, determining, when at least one radio link quality is equal to or greater than the threshold, that the radio link quality of a set of component carriers is good, and maintaining, when the radio link quality of the component carriers set is good, connection state with a current base station. Preferably, the radio link control method further includes determining, when the radio link qualities of all the component carriers is less than the threshold value, that the radio link quality of the component carriers set is bad and releasing, when the radio link quality of the component carriers set is bad, the connection state with the current base station.

Also, a radio link control apparatus of a terminal for a cellular radio communication system supporting carrier aggregation according to the present invention includes an RS subcarrier symbol receiver which receives reference signals for at least one component carrier and a radio link failure controller which measures radio link qualities of the at least one component carriers using the reference signals provided by the RS subcarrier symbol receiver, determines, when at least one radio link quality is equal to or greater than the threshold, that the radio link quality of a set of component carriers is good, and controls to maintain, when the radio link quality of the component carriers set is good, connection state with a current base station. Preferably, the radio link control apparatus controls to determine, when the radio link qualities of all the component carriers is less than the threshold value, that the radio link quality of the component carriers set is bad and release, when the radio link quality of the component carriers set is bad, the connection state with the current base station.

Advantageous Effects

As described above, in the system implementing wide transmission by aggregating carriers such as LTE-A, the present invention determines the radio link failure efficiently by reducing unnecessary radio link failure determinations. According to the present invention, it is possible to maintain the continuity of data transmission and reduce transmission delay caused by neighbor cell connection attempts.

DETAILED DESCRIPTION OF EXEMPLARY EMBODIMENTS

Detailed description of well-known functions and structures incorporated herein may be omitted to avoid obscuring the subject matter of the present invention. Exemplary embodiments of the present invention are described with reference to the accompanying drawings in detail. In addition, terms used in the following description of the present invention are prepared in view of functions thereof, so they will be changed depending on the intention of users, operators, or custom. Thus, definition of the terms must be determined based on the whole content of the specification.

Although the description is directed to the Advanced E-UTRA (or LTE-A) supporting carrier aggregation in the following embodiments of the present invention, it will be understood by those skilled in the art that the present invention can be applied to other communication systems supporting the similar technical background and channel format with a slight modification without departing from the spirit and scope of the invention.

The present invention proposed a method and apparatus for determining radio link failure in the wireless communication system securing wideband through carrier aggregation proposed as the subject matter of the present invention. Particularly, when the LTE-A system implements the wide transmission bandwidth by aggregating the LTE carriers, it is necessary to minimize the occurrence probability of the radio link failure so as to improve reliability of data communication and reduce the transmission delay.

Figure 1:
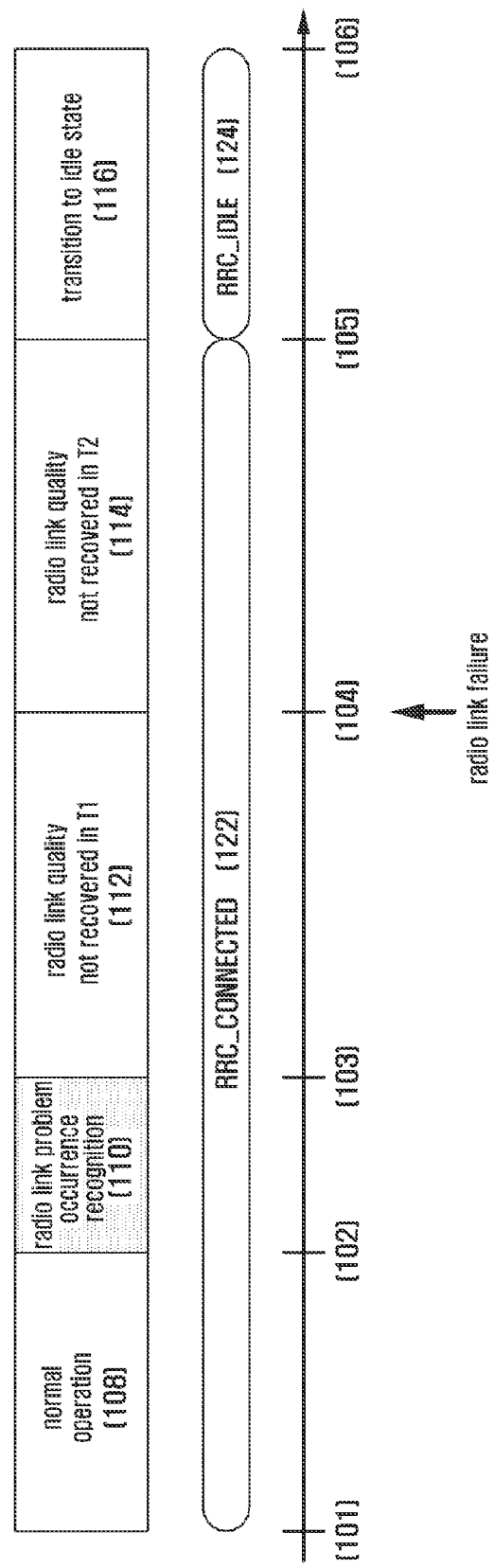
FIG. 1 is diagram illustrating a procedure for determining radio link failure in a conventional LTE system.
Figure 2:
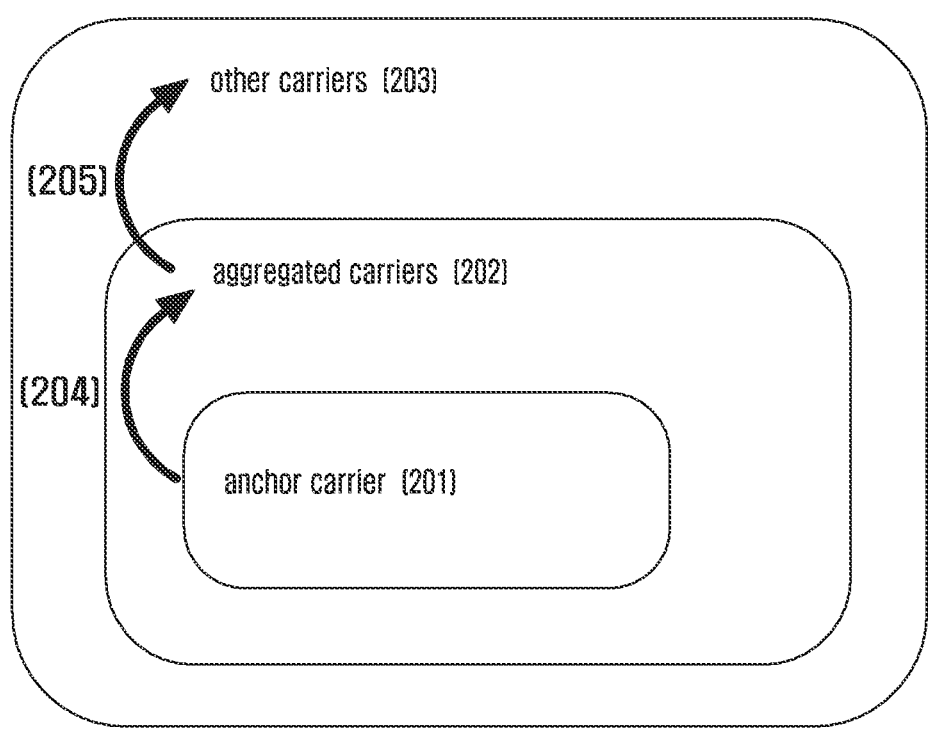
FIG. 2 is a diagram illustrating the concept for determining a radio link failure in a LTE-A system.

The subject matter of the present invention is described in detail hereinafter with reference to FIG. 2. FIG. 2 is a diagram illustrating the concept for determining a radio link failure in a LTE-A system according to an embodiment of the present invention.

The UE measures the radio link quality of each of the component carriers. The configuration information on the component carriers aggregated is notified to the UE by the eNB via signaling. For simplifying the explanation, a group of the aggregated component carriers is called Configured Component Carriers (CCC) hereinafter. The CCC includes at least one anchor carrier, and the anchor carrier works as a reference point for providing control information to the UE or the mobility control of the UE.

The UE measures the received signal strength of the reference signal (hereinafter, 'RS') of each component carrier receiving from the eNB for a predetermined duration and compares the received signal strength with the threshold Qout predetermined per component carrier to determine whether the radio link quality of the component carrier is good or bad (strong or weak). The threshold value Qout defined per component carrier is the received signal strength of RS corresponding to a Block Error Rate (BLER) of Physical Downlink Control Channel (PDCCH) and determined according to the bandwidth of the component carrier and a number of transmit antennas.

In more detail, the UE measures the radio link quality between the UE and the anchor carrier based on the received signal strength of the RS of the anchor carrier for a predetermined time duration (201). If the radio link quality measured to the anchor carrier is worse than the Qout defined for the anchor carrier over a predetermined time duration, the UE measures the radio link qualities of the rest component carriers (202) except for the anchor carrier rather than premature determination of radio link failure and compares the radio link qualities with the corresponding Qout values (204). If at least one of the component carriers has the radio link quality better than the corresponding threshold Qout, the UE configures a new CCC with the component carriers having the good radio link qualities.

Otherwise, if all the component carriers have the radio link qualities worse than the corresponding threshold Qout values, the UE determines radio link failure in the current cell (203) and attempt access to neighbor cells (205). At this time, if failing access to the neighbor cells, the UE ends the communication with the base station and enters idle state.

The radio link failure determination method of the present invention can be applied regardless of whether the aggregated component carriers are consecutive or non-consecutive in frequency domain and without limitation on the number of component carriers.

The radio link failure determination method proposed in the present invention is described in detail through following embodiments.

Figure 3:
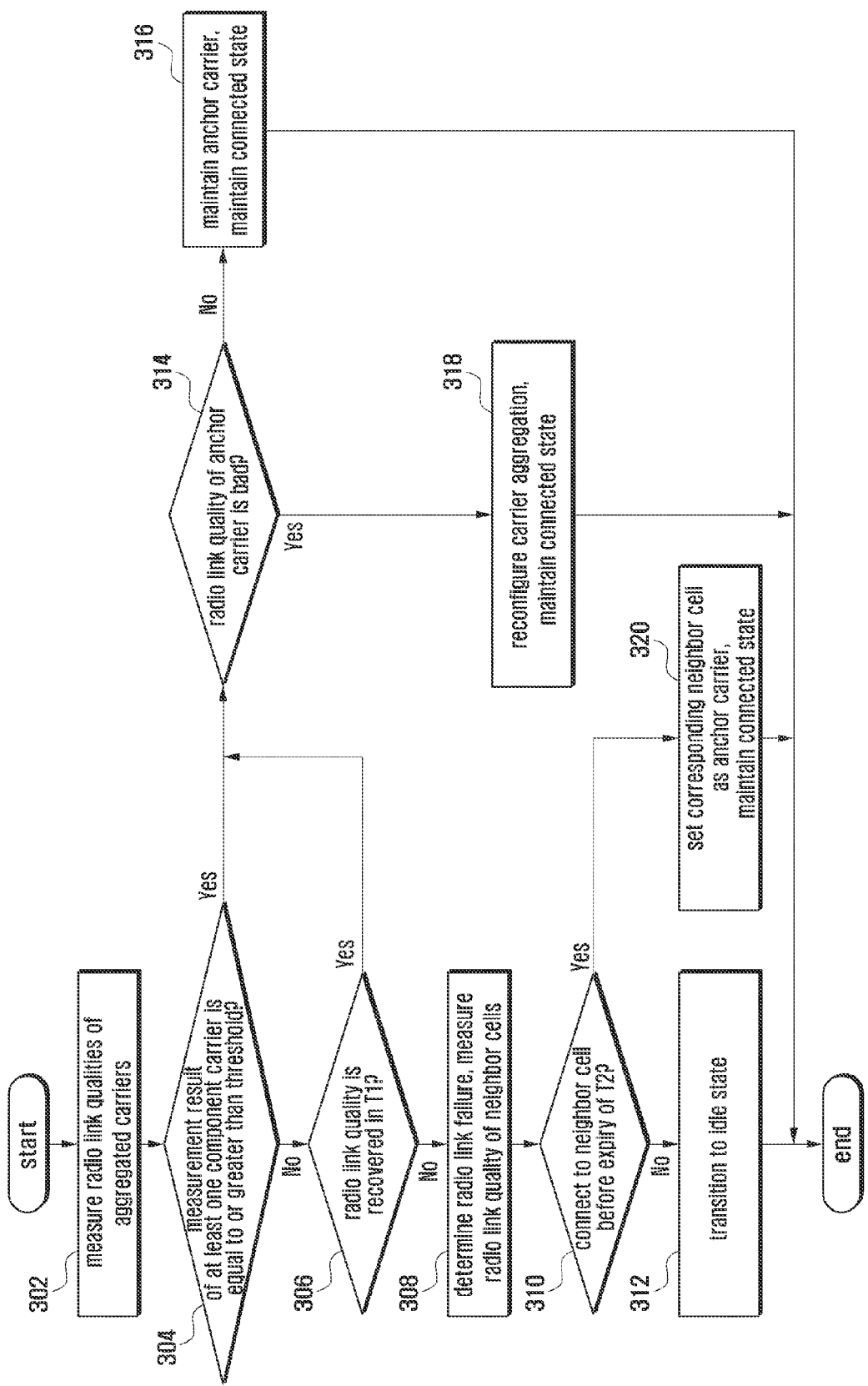
FIG. 3 is a flowchart illustrating a procedure for determining radio link failure in a wireless communication system according to an embodiment of the present invention.

FIG. 3 is a flowchart illustrating a procedure for a UE to determine radio link failure in a wireless communication system implementing wide bandwidth through carrier aggregation.

At step 302, the UE measures radio link quality of each component carrier. The UE measures the radio link quality for each component carrier with the received signal strength of RS received on the corresponding component carrier and calculates total radio link quality of the CCC.

At step 304, the UE determines whether at least one component carrier has the measurement result equal to or greater than the corresponding threshold value in the CCC. If there is at least one component carrier having the measurement result equal to or greater than the threshold value, the UE compares the radio link quality of the anchor carrier with the threshold value to determine whether the radio link quality is good or bad at step 314. If it is determined that the radio link quality of the anchor carrier is good, i.e., equal to or greater than the threshold value, the UE maintains current anchor carrier and CCE as they are and keeps the connection state (CONNECTED_STATE) with the base station at step 316. Otherwise if it is determined that the radio link quality of the anchor carrier is bad, i.e., less than the threshold value, the UE reconfigures the CCC with the component carriers, except for the anchor carrier, within the current CCE and keeps the connection state (CONNECTED_STATE).

At this time, the UE requests the eNB to set a new CCE with the component carriers of which radio link qualities are equal to greater than the threshold values and sets the component carrier having the best radio link quality as a new anchor carrier via signaling. The eNB can accept the request of the UE entirely or send the control information for adjusting the request to the UE and thus completes the reconfiguration.

Meanwhile, if all the component carriers have the measurement results less than the threshold value at step 304, the UE determines whether the radio link quality of the CCC is recovered before a predetermined time (timer T1) at step 306. As a result of step 306, if the radio link quality of the CCC is recovered, the UE branches the procedure to step 314.

If the radio link quality of the CCC is not recovered before the time T1 expires at step 306, the UE branches the procedure to step 308 to determine the occurrence of radio link failure in the CCE and measure the radio link qualities of the neighbor cells. Next, the UE attempts connection to the neighbor cell having the greatest (superior) radio link quality at step 310 and, if the connection is established successfully before a predetermined timer T2 expires, resets the corresponding neighbor cell as the anchor carrier while maintaining the connection state (CONNECTED_STATE) at step 320.

At this time, the UE requests the eNB to resets the neighbor cell having the best radio link quality as the anchor carrier via signaling. The eNB can accept the request of the UE entirely or send the control information adjusting the request to the UE and thus completes the reconfiguration. If the connection to the neighbor cell fails at step 310, the UE ends the connection with the eNB and enters the idle state.

T0, T1, and T2 representing time values are predetermined, and the eNB notifies the UE of these values via signaling or shared as the fixed values between the UE and the eNB.

How to determine the radio link quality of the CCC at step 304 of FIG. 3 is described hereinafter in more detail with reference to FIG. 4.

Figure 4:
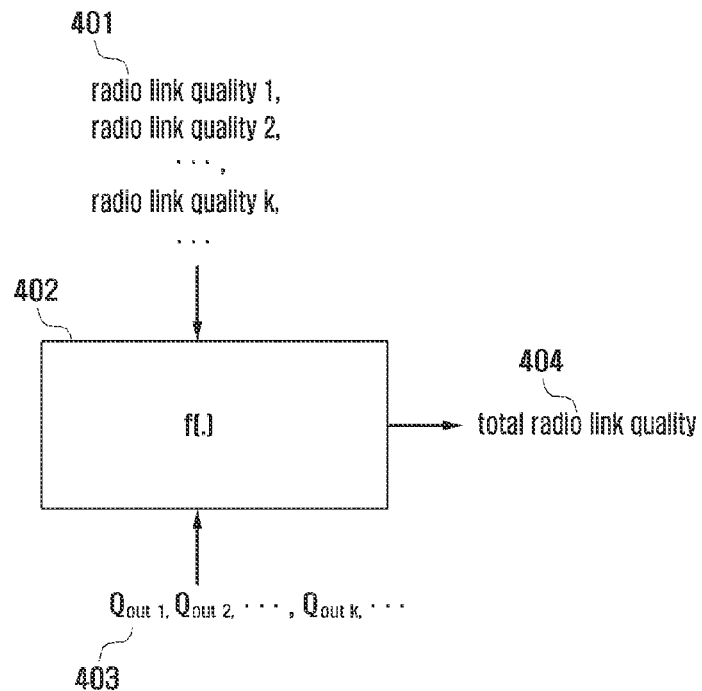
FIG. 4 is a diagram illustrating a method for calculating radio link quality of CCC in the LTE-A system according to an embodiment of the present invention.

FIG. 4 is a diagram illustrating step 304 for calculating the radio link quality of the CCC in more detail according to an embodiment of the present invention.

Defining the function for calculating the radio link quality of CCC as f(.), the function f(.) calculates the radio link quality 404 of the CCC with the input values of radio link qualities 1, 2, . . . , k 401 of individual component carriers constituting the CCC and Qout1, Qout2, . . . , Qoutk 403 of individual component carriers. The function f(.) compares the radio link qualities of the individual component carriers with the component carrier-specific threshold values and, if at least one component carrier maintains the radio link quality equal to or greater than the corresponding threshold value before the expiry of T0, determines that the radio link quality of the CCC is excellent (or good, used in the same meaning herein) and, otherwise if all the component carriers maintain the radio link qualities less than the corresponding threshold values before the expiry of T0, determines that the radio link quality of CCC is poor (or bad, used in the same meaning herein).

In the present invention, when at least one component carrier maintains the radio link quality equal to or greater than the threshold value, it is restricted that the UE makes a premature determination of radio link failure due to some component carriers having bad radio link qualities even though there is the component carrier maintaining good radio link quality in the CCC, thereby maintaining the continuity of data transmission and reducing transmission delay caused by unnecessary neighbor cell connection attempts.

Here, the threshold values Qout1, Qout2, and Qoutk 403 defined for individual component carriers correspond to the received signal strengths of RSs represented by Block Error Rate (BLER) of Physical Downlink Control Channel (PDCCH) and are determined depending on the bandwidths of individual component carriers and the number of transmit antennas.

A description is made of the definition of another operation of function f(.) for calculating the radio link quality of the CCC hereinafter with reference to FIG. 5. FIG. is a diagram illustrating step 304 for calculating the radio link quality of the CCC in more detail according to another embodiment of the present invention.

Figure 5:
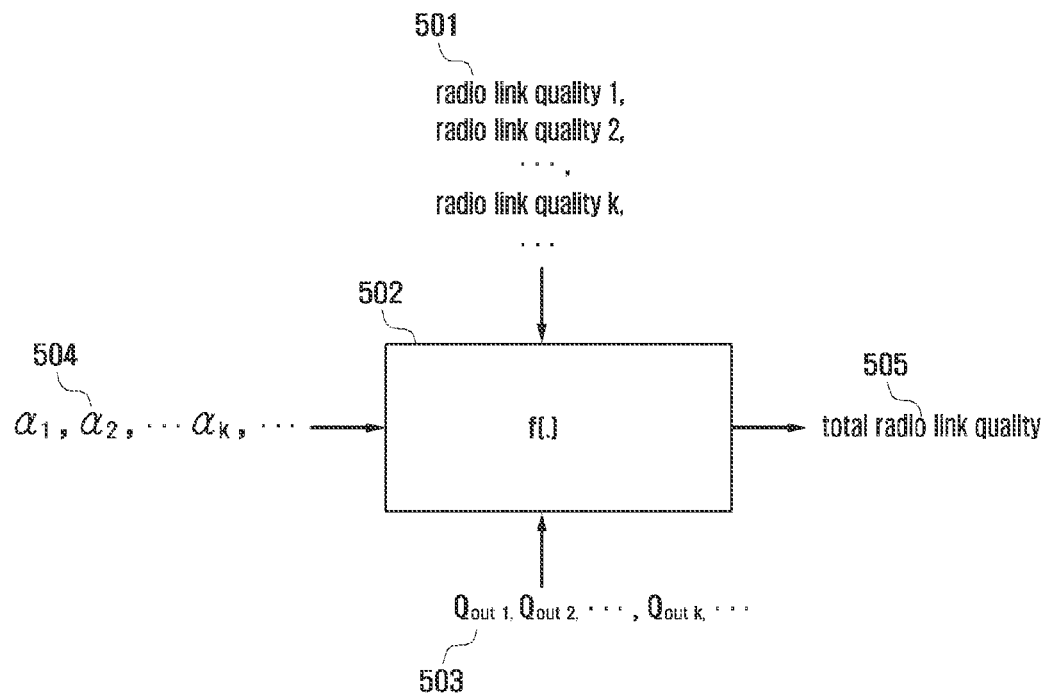
FIG. 5 is a diagram illustrating a method for calculating radio link quality of CCC in the LTE-A system according to another embodiment of the present invention.

In FIG. 5, the radio link quality of the CCC is calculated by applying weights to the component carriers constituting the CCC according to the importance of the component carriers. The importance of the component carrier is determined whether the corresponding component carrier is the anchor carrier or carrying the physical control channel for the UE.

In FIG. 5, the radio link quality of the CCC is determined with the additional input values of α1, α2, . . . , αk 504 as compared to FIG. 4. α1, α2, . . . , αk 504 are the weights applied to the individual component carriers and each is set to 1 for the anchor carrier and 0 for non-anchor carrier. In this case, the radio link quality of the CCC can be calculated directly from the radio link quality of the anchor carrier. That is, if the radio link quality of the anchor carrier to which the weight is applied is worse than the threshold value Qout of the anchor carrier for the time duration T0, it is determined that the radio link quality of the CCE is bad even though there is any component carrier having good radio link quality among the rest component carriers. This means that the component carriers having the weight of 0 do not influence the calculation of radio link quality of the CCC, but the radio link quality of the component carrier having the weight of 1 is input to the function f(.) of FIG. to influence the result. The weights α1, α2, . . . , αk 504 are notified to the UE by the eNB via signaling in CCE configuration or reconfiguration process.

However to determine the recovery of the radio link quality of CCC over a predetermined value before the expiry of the timer T1 at step 306 of FIG. 3 is described hereinafter in more detail with reference to FIG. 6.

Figure 6:
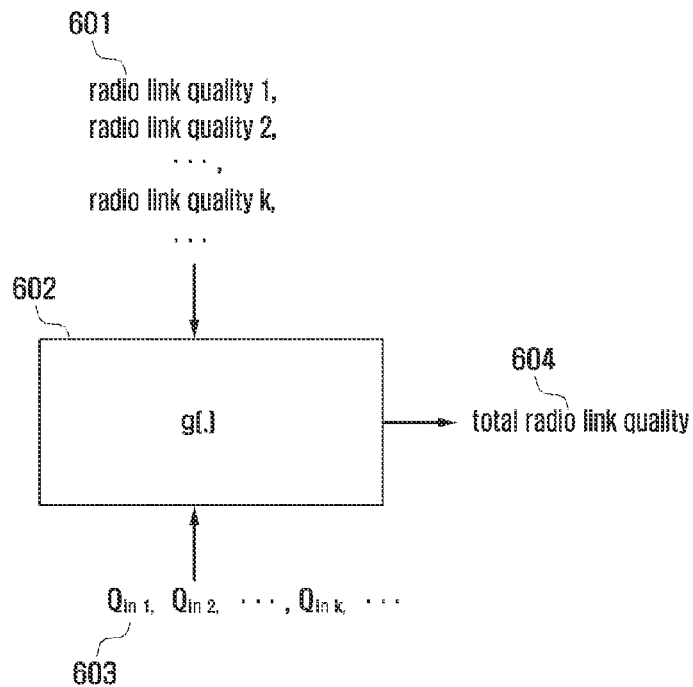
FIG. 6 is a diagram illustrating a method for determining radio link quality recovery of CCC in the LTE-A system according to an embodiment of the present invention.

FIG. 6 is a diagram illustrating step 306 for determining whether the radio link quality of the CCC is recovered according to an embodiment of the present invention.

Here, if the function for determining whether the radio link quality of the CCE is recovered is defined as g(.), the function g(.) calculates the radio link quality recovery 604 of the CCC with the input values of the radio link qualities 1, 2, . . . , k 601 and the component carriers threshold values Qin1, Qin2, . . . , Qink 603.

The function g(.) compares the radio link quality of each of the component carriers with the threshold value of the corresponding component carrier and, if at least one of the component carriers maintains the good quality equal to or greater than the threshold value for the time duration T1, determines the recovery of the radio link quality of the CCC and, otherwise if all the component carrier maintain the bad qualities less than the corresponding threshold values, determines recovery failure of radio link quality of the CCC.

Through the above described operations, the present invention prevent the UE from making a premature determination of radio link failure due to some component carriers having bad radio link qualities even though there is the component carrier maintaining good radio link quality in the CCC, thereby maintaining the continuity of data transmission and reducing transmission delay caused by unnecessary neighbor cell connection attempts.

The threshold values Qin1, Qin2, . . . , Qink 603 defined for individual component carriers correspond to the received signal strengths of the RSs represented by Block Error Rate (BLER) of Physical Downlink Control Channel (PDCCH) and are determined based on the bandwidths of the component carriers and the number of transmit antennas.

Figure 7:
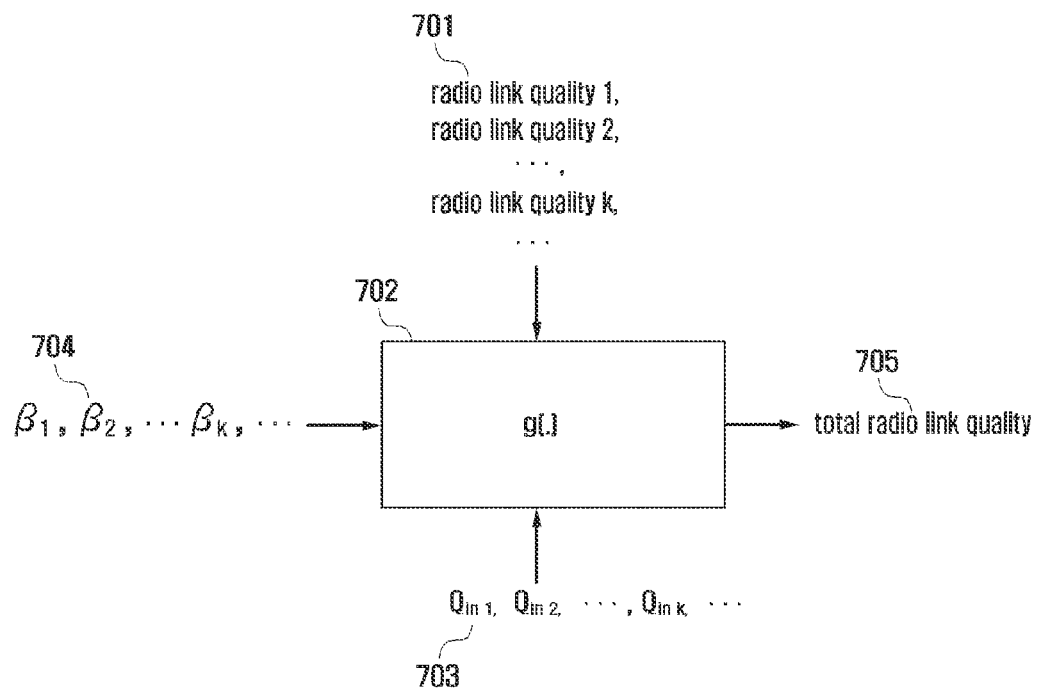
FIG. 7 is a diagram illustrating a method for determining radio link quality recovery of CCC in the LTE-A system according to another embodiment of the present invention.

A description is made of the definition of another operation of function g(.) for determining the radio link quality recovery of the CCC herein after with reference to FIG. 7. FIG. 7 is a diagram illustrating step 306 for determining the radio link quality recovery of the CCC according to another embodiment of the present invention.

In FIG. 7, whether the radio link quality of the CCE is recovered is calculated with the weight applied according to the importance of the component carrier in the CCE. The importance of the component carrier is determined whether the corresponding component carrier is the anchor carrier or carrying the physical control channel for the UE. In FIG. 7, the radio link quality of the CCC is determined with the additional input values of $\beta 1, \beta 2, \ldots, \beta k$ 704 as compared to FIG. 6. $\beta 1, \beta 2, \ldots, \beta k$ 704 are the weights applied to the individual component carriers and each is set to 1 for the anchor carrier and 0 for non-anchor carrier.

In this case, the radio link quality of the CCC can be calculated directly from the radio link quality of the anchor carrier. That is, if the radio link quality of the anchor carrier to which the weight is applied is worse than the threshold value Qin of the anchor carrier for the time duration T1, it is determined that the radio link quality of the CCE is not recovered even though there is any component carrier having good radio link quality among the rest component carriers. This means that the component carriers having the weight of 0 do not influence the calculation of radio link quality recovery of the CCC, but only the radio link quality of the component carrier having the weight of 1 is input to the function g(.) of FIG. 6 to influence the result. The weights $\beta 1, \beta 2, \ldots, \beta k$ 704 are notified to the UE by the eNB via signaling in CCE configuration or reconfiguration process.

Figure 8:
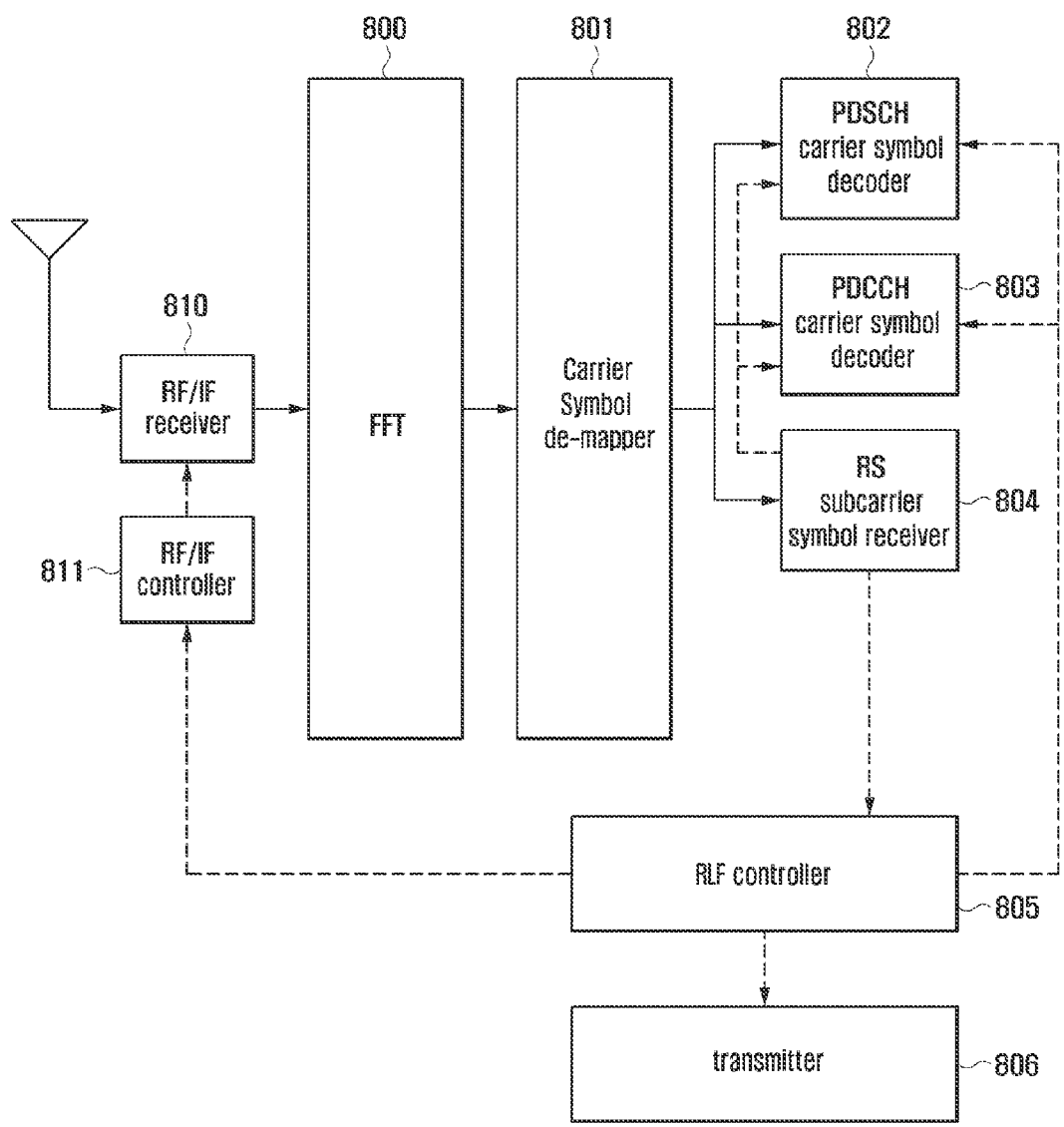
FIG. 8 is a block diagram illustrating an apparatus for determining radio link failure of the UE according to an embodiment of the present invention.

FIG. 8 is a block diagram illustrating a configuration a receiver of the UE for determining radio link failure according to an embodiment of the present invention.

The RF/IF receiver 810 configures the bandwidth and reception center frequency to receiving the downlink signal on the CCE set for the UE under the control of the RF/IF controller 811.

The FFT 800 performs Fourier Transform on the received downlink OFDM signal and outputs individual subcarrier reception symbols. The reception symbols are input to the decoder of the corresponding channel by means of the carrier symbol de-mapper 801.

The Physical Downlink Shared Channel (PDSCH) and Physical Downlink Control Channel (PDCCH) symbol decoders 802 and 803 performs decoding on the subcarrier reception symbols of the corresponding channels to acquire data and control information.

The RS symbol receiver 804 extracts RS from the signal received by the UE and use the RS for channel estimating and compensating on the PDSCH and PDCCH and determining whether the radio link failure occurred.

The radio link failure controller (RLF controller) 805 measures the radio link qualities of the component carriers based on the RSs of the respective component carriers and determine the radio link failure based on the measurement result.

In more detail, the RLF controller measures the radio link quality of each component carrier using the RS on one or more component carriers. According to an embodiment of the present invention, the radio link failure controller can measure the radio link quality by applying weight to each component carrier.

If at least one of the radio link qualities measured on the component carriers is equal to or greater than a predetermined threshold value, the RLF controller determines that the radio link quality of a set of the component carriers is good and thus maintains the connection state with the current eNB.

In this case, the radio link failure controller measures the radio link quality of the anchor carrier and, if the measured radio link quality of the anchor carrier is equal to or greater than the threshold value of the anchor carrier, controls to maintains the current anchor carrier.

However, if the measured radio link quality of the anchor carrier is less than the threshold value of the anchor carrier, the radio link failure controller can control to reconfigure the set of the component carrier with the component carrier except for the anchor carrier in the component carrier set. In this case, the radio link failure controller can select the component carrier having the best radio link quality as a new anchor carrier.

Meanwhile, if the radio link qualities of all the component carriers are less than the threshold values, the RLF controller determines that the radio link quality of the component carrier set is bad so as to end the connection state with the current eNB.

In this case, the radio link failure controller determines whether the radio link quality of the component carrier set is recovered before the expiry of a predetermined time duration. According to an embodiment of the present invention, the radio link failure controller can determine the radio link quality recovery by applying weight to each component carrier.

If the radio link quality is not recovered to a good state, the radio link failure controller determines the radio link failure of the current radio link in the current component carrier set and measures the radio link quality of neighbor cells. Afterward, the radio link failure controller can control to attempt connection to the neighbor cell having the best radio link quality.

If it is failed to connect to the neighbor cells, the radio link failure controller ends the connection with the eNB and enters idle state.

In order to control the operations as above, the radio link failure controller controls the RF/IF controller 811 to search, when the radio link failure is determined, for the neighbor cell having the best radio link quality and controls the transmitter 806 to connect to the neighbor cell having the best radio link quality. If it is failed to connect to the neighbor cell before the expiry of T2, the radio link failure controller 805 controls the transmitter 806 to stop transmission and controls the PDSCH and PDCCH symbol decoders 802 and 803 to stop the normal data reception operations and then enter idle state.

The specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A radio link control method of a terminal for a cellular radio communication system supporting carrier aggregation, comprising:
  measuring radio link qualities of more than one component carrier included in configured component carriers;
  applying a weight to each component carrier included in the configured component carrier;
  calculating radio link quality values by applying the weight for each of the more than one component carrier included in the configured component carriers to the radio link qualities;

determining whether at least one radio link quality value is equal to or greater than a threshold value;

determining, when at least one radio link quality value is equal to or greater than the threshold and at least one of the measured radio link qualities is less than the threshold, that a radio link quality of the configured component carriers is good;

maintaining, when the radio link quality of the configured component carriers is good, a connection state with a current base station;

determining, when each radio link quality value of all the component carriers included in configured component carriers is less than the threshold value, that the radio link quality of the configured component carriers is bad; and releasing, when the radio link quality of the configured component carriers is bad, the connection state with the current base station, wherein the weight is determined based on at least whether the component carrier is an anchor carrier or whether the component carrier carries a physical control channel for the terminal.

2. The radio link control method of claim 1, wherein maintaining connection state comprises:

measuring a radio link quality of an anchor carrier; and maintaining, when a radio link quality value of the anchor carrier to which the weight is applied is equal to or greater than a threshold value of the anchor carrier, the connection state with the base station.

3. The radio link control method of claim 2, further comprising reconfiguring, when the radio link quality value of the anchor carrier is less than the threshold value of the anchor carrier, the configured component carriers with rest component carriers of the configured component carriers except for the anchor carrier.

4. The radio link control method of claim 3, wherein reconfiguring the configured component carriers further comprises selecting the component carrier having a best radio link quality as a new anchor carrier.

5. The radio link control method of claim 1, wherein releasing the connection state comprises:

determining whether the radio link quality of the configured component carriers is recovered before expiry of a predetermined time;

judging, when the radio link quality of the configured component carriers is not recovered, that the radio link failure has occurred in the current configured component carriers;

measuring, when the radio link failure has occurred, radio link qualities of neighbor cells; and attempting connection to the neighbor cell having a best radio link quality.

6. The radio link control method of claim 5, further comprising:

ending, when the connection to the neighbor cell fails, the connection state with the current base station; and entering idle state.

7. The radio link control method of claim 5, wherein determining whether the radio link quality of the configured component carriers is recovered comprises:

determining whether the at least one radio link quality value of each component carrier to which the weight is applied is recovered.

8. A radio link control apparatus of a terminal for a cellular radio communication system supporting carrier aggregation, comprising:

a Reference Signal (RS) subcarrier symbol receiver configured to receive reference signals for at least one component carrier; and a radio link failure controller configured to:

measure radio link qualities of the at least one component carrier included in configured component carriers using the reference signals provided by the RS subcarrier symbol receiver, apply a weight to each component carrier included in the configured component carriers, calculate radio link quality values by applying the weight for each of the at least one component carrier included in the configured component carriers to the radio link qualities, determine, when at least one radio link quality value is equal to or greater than the threshold and at least one of the measured radio link qualities is less than the threshold, that a radio link quality of the configured component carriers is good, and maintain, when the radio link quality of the configured component carriers is good, a connection state with a current base station, wherein the radio link failure controller is further configured:

determine, when each radio link quality value of all the component carriers included in configured component carriers is less than the threshold value, that the radio link quality of the configured component carriers is bad, and release, when the radio link quality of the configured component carriers is bad, the connection state with the current base station, and wherein the weight is determined based on at least whether the component carrier is an anchor carrier or whether the component carrier carries a physical control channel for the terminal.

9. The radio link control apparatus of claim 8, wherein the radio link failure controller is further configured to measure a radio link quality of an anchor carrier and maintain, when a radio link quality value of the anchor carrier to which the weight is applied is equal to or greater than a threshold value of the anchor carrier, the connection state with the base station.

10. The radio link control apparatus of claim 9, wherein the radio link failure controller is further configured to reconfigure, when the radio link quality value of the anchor carrier is less than the threshold value of the anchor carrier, the configured component carriers with rest component carriers of the configured component carriers except for the anchor carrier.

11. The radio link control apparatus of claim 10, wherein the radio link failure controller selects the configured component carriers having a best radio link quality as a new anchor carrier.

12. The radio link control apparatus of claim 8, wherein the radio link failure controller is further configured to:

determine whether the radio link quality of the configured component carriers is recovered before expiry of a predetermined time, judge, when the radio link quality of the configured component carriers is not recovered, that the radio link failure has occurred in the current configured component carriers, measure, when the radio link failure has occurred, radio link qualities of neighbor cells, and attempt connection to the neighbor cell having a best radio link quality.

13. The radio link control apparatus of claim 12, wherein the radio link failure controller is further configured to end, when the connection to the neighbor cell fails, the connection state with the current base station and enter idle state.

14. The radio link control apparatus of claim 12, wherein the radio link failure controller is further configured to determine whether the radio link quality value of each component carrier to which the weight is applied is recovered.

* * * * *